US008230465B2

(12) United States Patent
Bodlaender (10) Patent No.: US 8,230,465 B2
(45) Date of Patent: Jul. 24, 2012

(54) DATA NETWORK, USER TERMINAL AND METHOD FOR PROVIDING RECOMMENDATIONS

(75) Inventor: Maarten Peter Bodlaender, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 1008 days.

(21) Appl. No.: 10/526,868

(22) PCT Filed: Aug. 5, 2003

(86) PCT No.: PCT/IB03/03395
§ 371 (c)(1),
(2), (4) Date: Mar. 4, 2005

(87) PCT Pub. No.: WO2004/023358
PCT Pub. Date: Mar. 18, 2004

(65) Prior Publication Data
US 2005/0278758 A1   Dec. 15, 2005

(30) Foreign Application Priority Data
Sep. 9, 2002  (EP) .................................. 02078661

(51) Int. Cl.
H04N 7/18   (2006.01)
H04N 7/173  (2011.01)
G06F 7/00   (2006.01)
G06F 17/00  (2006.01)
H04L 29/08  (2006.01)

(52) U.S. Cl. ........ 725/80; 725/120; 707/624; 455/414.1

(58) Field of Classification Search ............... 725/39, 725/49, 80, 120
See application file for complete search history.

(56) References Cited

U.S. PATENT DOCUMENTS 5,235,414 A * 8/1993 Cohen ........................... 725/13
5,414,757 A * 5/1995 Thompson ................. 379/88.08
5,608,899 A * 3/1997 Li et al. ............................ 1/1
5,758,355 A * 5/1998 Buchanan ........................ 1/1
(Continued)

FOREIGN PATENT DOCUMENTS
WO   WO 0146843   6/2001

OTHER PUBLICATIONS

N. Glance et al: "Pollen: Using People As a Communication Medium", Computer Networks, Elsevier Science Publishers B.V., Amsterdam, NL, vol. 35, No. 4, Mar. 2001. pp. 429-442, XP004304857.

*Primary Examiner* — Brian T Pendleton
*Assistant Examiner* — Jonathan V Lewis (57) ABSTRACT

The invention relates to an ad-hoc peer to peer network for providing recommendations. User terminals (100, 103) of the data network comprise a local database (115) with community reference information. A processor (111) determines if a communication with a second user terminal (103) is possible and if so, communication is established by a direct wireless link. Community preference information is exchanged between the two user terminals (100,103) and the database (115) is updated accordingly by a database controller (113). The user terminal (100) also comprises a recommendation processor (117) which generates a recommendation based on the community preference information. The invention is particular applicable to small low cost terminals, such as mobile phones or wireless equipped Personal Digital Assistants.

17 Claims, 3 Drawing Sheets

| Media Clip | 1 | 2 | 3 | 4 |
|---|---|---|---|---|
| User 1 | 8 |   | 9 | 4 |
| User 2 |   | 9 | 9 | 7 |
| User 3 | 2 | 8 | 3 | 8 |
| User 4 |   |   | 5 |   |
| User 5 | 1 |   |   |   |
| User 6 | 2 | 4 |   | 8 |

200

U.S. PATENT DOCUMENTS

| | | | |
|---|---|---|---|
| 5,956,719 A * | 9/1999 | Kudo et al. | 707/610 |
| 6,236,395 B1 * | 5/2001 | Sezan et al. | 715/723 |
| 6,418,169 B1 * | 7/2002 | Datari | 375/240.28 |
| 6,463,427 B1 * | 10/2002 | Wu | 707/610 |
| 6,651,105 B1 * | 11/2003 | Bhagwat et al. | 709/239 |
| 7,072,846 B1 * | 7/2006 | Robinson | 705/7.32 |
| 7,454,509 B2 * | 11/2008 | Boulter et al. | 709/231 |
| 7,539,778 B2 * | 5/2009 | Hansmann et al. | 709/248 |
| 2002/0002705 A1 * | 1/2002 | Byrnes et al. | 725/14 |
| 2002/0007354 A1 * | 1/2002 | Deguchi | 705/418 |
| 2002/0073331 A1 * | 6/2002 | Candelore | 713/200 |
| 2002/0184622 A1 * | 12/2002 | Emura et al. | 725/34 |
| 2003/0005448 A1 * | 1/2003 | Axelsson et al. | 725/58 |
| 2003/0022682 A1 * | 1/2003 | Weston et al. | 455/512 |
| 2003/0030752 A1 * | 2/2003 | Begeja et al. | 348/563 |
| 2003/0037333 A1 * | 2/2003 | Ghashghai et al. | 725/46 |
| 2003/0110489 A1 * | 6/2003 | Gudorf et al. | 725/35 |
| 2003/0110501 A1 * | 6/2003 | Rafey et al. | 725/46 |
| 2003/0208754 A1 * | 11/2003 | Sridhar et al. | 725/34 |
| 2003/0229900 A1 * | 12/2003 | Reisman | 725/87 |
| 2003/0237091 A1 * | 12/2003 | Toyama et al. | 725/40 |
| 2004/0003403 A1 * | 1/2004 | Marsh | 725/53 |
| 2004/0010808 A1 * | 1/2004 | deCarmo | 725/139 |
| 2004/0024954 A1 * | 2/2004 | Rust | 711/100 |
| 2004/0025180 A1 * | 2/2004 | Begeja et al. | 725/46 |
| 2006/0075456 A1 * | 4/2006 | Gray et al. | 725/135 |

\* cited by examiner

FIG. 1

| Media Clip | 1 | 2 | 3 | 4 |
|---|---|---|---|---|
| User 1 | 8 |   | 9 | 4 |
| User 2 |   | 9 | 9 | 7 |
| User 3 | 2 | 8 | 3 | 8 |
| User 4 |   |   | 5 |   |
| User 5 | 1 |   |   |   |
| User 6 | 2 | 4 |   | 8 |

DATA NETWORK, USER TERMINAL AND METHOD FOR PROVIDING RECOMMENDATIONS

The Invention relates to a data network, user terminal and method for providing recommendations and in particular for providing community based recommendations.

In recent years, the accessibility to and provision of information and content such as TV programmes, film, music and books etc have increased explosively. Especially, the emergence of the Internet as an increasingly available source of information has resulted in the main problem facing most users not being whether appropriate information or content is available, but rather how this can be found. Specifically, it has become increasingly important that the content and services provided to a user are targeted to this user and thus meet his specific user profile and reflect his personal preferences.

One method of customizing e.g. the information and content provision to a specific user is a recommendation based approach, wherein specific content or information is determined to be suited for a user and therefore recommended to him. One recommendation approach is a community based recommendation approach, wherein feedback and preferences received from a suitable community are used to determine recommendations for a user in that community. Thus, for example, certain behaviours or actions are observed and categorised for a community, and if another user exhibits a similar behaviour, the information or content accessed by users in that category may be recommended.

An example of a recommendation system is known from several e-commerce Internet sites, wherein the purchasing behaviour of users is monitored. A user having a purchasing behaviour similar to a stored behaviour is recommended purchases similar or identical to purchases made by other users in that group. A well known example is when a purchaser of a book is recommended a number of other books that have been purchased by other users also purchasing the current book.

Known methods for providing recommendation systems comprise centrally collecting and collating relevant information and storing it in a central database. A recommendation is made by accessing the database with relevant information and retrieving suitable recommendations.

However, the known approach comprises a number of disadvantages including requiring that users must be connected to the central processing unit both for being provided with a recommendation but also for the user behaviour to be monitored and stored. Hence, a recommendation system having improved performance and/or flexibility would be advantageous.

Accordingly the invention seeks to improve the performance and/or flexibility of a recommendation system.

To this end the invention provides a user terminal for a network is provided, the user terminal comprising: a local database comprising community preference information related to preferences of a community of users; a processor for determining if a communication with a second user terminal is possible; a receiver for receiving community preference information from the second user terminal if communication is possible; a database controller for updating the database of community preference information in response to the received community preference information; a recommendation processor for generating a recommendation in response to the community preference information of the local database.

Advantageously, the user terminal thus enables the generation of recommendation based on locally stored community preference information, and thus allows for recommendations to be generated even if, for example, the user terminal is not connected to any other entity. Further, the community preference information can be dynamically updated, as and when this is feasible. Thus, a user terminal is provided which allows for a dynamic, organic, changing, automatically updating and automatically adapting recommendation to be generated based only on locally held community preference information. Hence, a complex organic community of users receiving recommendations based on the community preference can be established by use of very simple user terminals and communication means.

According to one aspect of the invention, the community preference information relates to media clips and the recommendation is of a media clip. Hence, a simple system of community recommendation for media clips, such as songs and video clips, is provided.

According to another aspect of the invention, the user terminal is a wireless user terminal. This provides simple yet efficient communication means that allow for a portable terminal, which may be of very small size.

According to a different aspect of the invention, the communication with the second user terminal is over a direct wireless link between the user terminal and the second user terminal. Hence, a simple communication is provided requiring very low resource use and which does not requiring the presence of any intermediate communication system or entities.

According to another aspect of the invention, the local database is operable to comprise community preference information related to the whole community. Thus, a very accurate recommendation based on the preferences of a large community can be generated based only on locally stored information.

According to a different aspect of the invention, the user terminal is operable to communicate community preference information from the local database to the second user terminal if communication with the second user terminal is possible. Thus, community preference information can be exchanged between two user terminals, thereby providing for an efficient update of community preference information in both user terminals, and allowing for a fast and efficient dissemination of community preference information throughout the community.

According to another aspect of the invention, the user terminal is operable to communicate with the second user terminal using a peer to peer protocol. Hence, a peer to peer system is enabled which allows fast, simple and direct communication between user terminals, without requiring complex or centralised control or protocols.

According to a different aspect of the invention, the received community preference information comprises time information and the database controller is operable to update the community preference information of the local database in response to this time information. Thus, efficient and speedy update of the locally stored community preference information is enabled, whereby it can be ensured that the community preference information stored is always the most up to date information received.

According to another aspect of the invention, the community preference information comprises a user rating. This provides for a simple yet highly reliable and accurate measure of the user preference, which allows for very accurate recommendations based on locally stored information.

According to a different aspect of the invention, the user terminal further comprises means for communicating the recommendation to another user terminal. Hence, a mixture of user terminals with varying functionality can be deployed while allowing for recommendations to be made on user terminals not having functionality for generating recommendations of have limited functionality for this. Thus, recommendations based on community preference information may be provided to user terminals not having functionality to determine these recommendations.

According to another aspect of the invention, the user terminal further comprises an interface for receiving community preference information from the Internet. Thus, in addition to receiving community preference information from other user terminals, the community preference information may be received through a connection to the Internet thereby allowing the user terminal to take advantage of any community preference information stored there. It further allows this information to be stored locally, and thus used for recommendations even when the user terminal is not connected to the Internet.

According to a different aspect of the invention, the received community preference information is received in a prioritised order. In this way, it is ensured that when communication can only be established for a limited duration, the most relevant and/or important community preference information is communicated first.

According to yet another feature of the invention, the user terminal comprises a priority controller for determining a priority of elements of the community preference information and a transmitter for communicating this priority to the second user terminal. Hence, since the user terminal receiving the community preference information informs the transmitting user terminal of a preferred priority, it is possible to prioritise the transmission of community preference information to exactly meet the needs of the receiving user terminal. Hence, it allows for optimised exchange of community preference information.

The invention further provides a data network comprising at least one user terminal as above. Preferably the data network is a peer to peer data network. Thus, a data network comprising user terminals which can dynamically exchange community preference information, when communication is possible, is enabled, with the user terminals being able to provide recommendations based on local community preference information. Thus a dynamic and organic community is enabled wherein recommendations automatically and dynamically are adapted to the community as community preference information spreads throughout the community through ad-hoc connections. Thus, recommendations based on a community are enabled in a network requiring no central access or overall control structure. Rather low complexity, and thus low cost, user terminals can be used.

Preferably, the data network comprises a plurality of wireless user terminals, and at least one of the plurality of wireless user terminals is operable to receive community preference information from a fixed network, such as the Internet, and distribute the community preference information from the fixed network to other wireless user terminals, preferably while disconnected from the fixed network. This provides the advantage, that the data network additionally can include information (e.g. centralised information) available through the fixed network, and which can be disseminated throughout the community based on only sporadic/temporary connections to the fixed network by only a subset of the user terminals.

According to a third aspect of the invention, there is provided a method of providing a recommendation to a user of a user terminal, the method comprising the steps of: locally in the user terminal storing a local database comprising community preference information related to preferences of a community of users; determining if a communication with a second user terminal is possible; and if so receiving community preference information from the second user terminal; updating the database of community preference information in response to the received community preference information; and generating a recommendation in response to the community preference information of the local database; and providing the recommendation to the user.

An embodiment of the invention will be described, by way of example only, with reference to the drawings, in which

Figure 1:
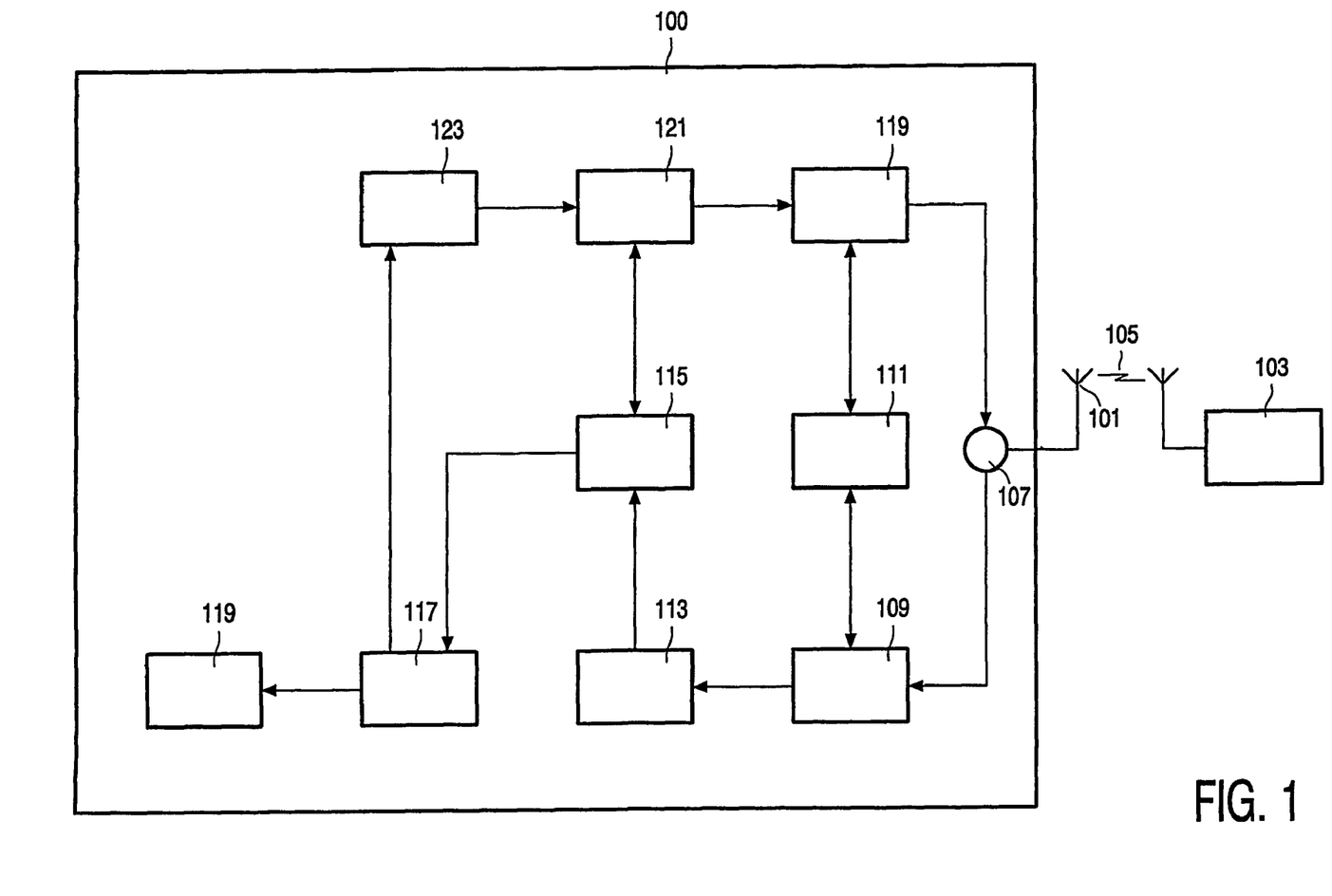
FIG. 1 is an illustration of a user terminal in accordance with an embodiment of the invention.

FIG. 1 is an illustration of a user terminal 100 in accordance with an embodiment of the invention.

The user terminal may for example be a computer, a data terminal, a personal data assistant (PDA), a mobile phone or any other suitable user terminal but is in the preferred embodiment a wireless user terminal such as for example a wireless PDA comprising functionality for radio communication.

The user terminal 100 comprises an antenna 101 for communicating with a second user terminal 103 over a radio communication link 105 according to any suitable radio communication protocol. The antenna is connected to a duplexer 107 which separates receive and transmit signals such that the same antenna can be used for both transmission and reception of radio signals over the communication link 105.

The duplexer 107 is connected to a receiver 109 which is connected to a communication processor 111 and a database controller 113. The database controller 113 is connected to a database 115. The user terminal 100 further comprises a recommendation processor 117 which is connected to the database 111 and is operable to generate a recommendation for a user based on community preference information stored in the database 115. The user terminal 100 also comprises a user interface 119 connected to the recommendation processor 117. The user interface 119 is operable to provide the recommendation to the user in any suitable form, and in particular to display the recommendation to the user on a suitable visual display unit, which may be part of the user terminal 100 or may be an external unit.

In the preferred embodiment, the user terminal 100 further comprises a transmitter 119 which is operable to transmit signals that can be received by other user terminals 103. It furthermore comprises a transmit controller 121 which is connected to the database 115 and the transmitter 119. The transmit controller is operable to access the database 115 to retrieve community preference information. It furthermore controls the transmitter 119 such that the community preference information is transmitted in accordance with a suitable communication protocol, such that it can be received by other user terminals 103. Thus, the user terminal 100 is operable to communicate community preference information from the local database 115 to the second user terminal 103, if communication with the second user terminal 103 is possible.

The database comprises community preference information related to preferences of a community of users. The community of users is in the preferred embodiment a group of users performing activities or providing information related to one or more specific contents, activities, topics or other information. In the described embodiment, the recommendation will, by way of example, be of a media clip such as a song or video clip. Hence in the described embodiment, the community comprises users performing an activity or providing information related to media clips. Specifically, the community comprises users of user terminals configured to exchange or provide information related to media clips.

In the preferred embodiment the community preference information relates to the preference of one or more users of the community for one or more media clips. Preferably, the database comprises community preference information related to a large number of media clips from a large number of users in the community. The community preference information may be any relevant information that can be related to the preference of a user. For example, the community preference information may comprise information such as a rating given to a media clip by a user, and preferably ratings from a large group of users are used to derive an average rating of the media clip. As another example, the community preference information may be related to the number of times a user plays a specific media clip. Alternatively or additionally, the average time the media clip is played can be used to measure the preference of media clips. In this example clips for which the playback is frequently terminated are considered of reduced preference compared to media clips which are frequently fully played.

Further, the community preference information preferably comprises information of interrelated preferences between different media clips. For example, the community preference information associated with one media clip may comprise a list of other media clips that have a high preference value for users which also have a high preference for the current clip. In its simplest form, the community preference information related to one media clip simply comprises a list of e.g. 5 of the most played media clips by users playing the current clip.

Thus, the database 115 comprises community preference information that is used by the recommendation processor 117 to generate a recommendation. It is within the contemplation of the invention that any suitable algorithm for generating a recommendation from the community preference information can be used. Likewise, the database 115 may be structured in any suitable way allowing the recommendation processor 117 to access the database 115 such that a recommendation can be made.

In the preferred embodiment, data is stored in the database 115 in a matrix structure wherein there is a column for each media clip and a row for each user. Each entry comprises a user preference indication such as e.g. a user rating or the number of times the media clip has been played by that user.

Figure 2:
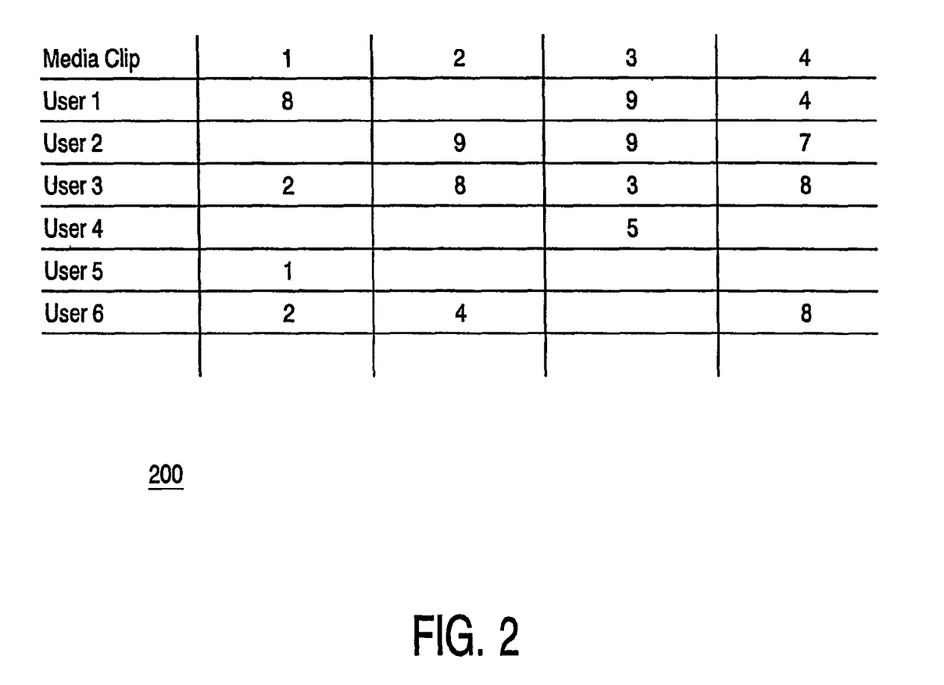
FIG. 2 is an illustration of the structure of the database in accordance with a preferred embodiment of the invention.

FIG. 2 is an illustration of the structure 200 of the database 115 in accordance with a preferred embodiment of the invention. The database 115 comprises a column for each of four media clips, e.g. songs, and a row for each of six users. In the specific example, the entries of the matrix is a user preference indication determined as a user rating of the media clip on a scale from one to ten. Thus, the table in this example shows that User 1 has rated media clip 1 as 8, clip 3 as 9 and clip 4 as 4. User 1 has not provided any user rating of media clip 2, for example because the user has not played this media clip. Similarly, User 2 has not provided a user rating of media clip 1 but rated clip 2 as 9, clip 3 as 3 and clip 4 as 7 and so on for users 3 to 6. For clarity and brevity, only six users and four media clips have been shown in the specific example but typically community preference information for several thousands of users and media clips are stored in the database 115.

In the preferred embodiment, the database is dynamically expanded as information is obtained such that a new row is introduced when preference information for a new user is collected and a new column is introduced when preference information for a new media clip is encountered. Rows corresponding to users having little or outdated information may in some embodiments be deleted to reduce the size of the database. Likewise columns corresponding to rarely played media clips may be removed in some embodiments.

In the specific example, the recommendation processor 117 determines which media clip is played by the user of the user terminal. It then accesses the database and specifically the column corresponding to the played media clip. The recommendation processor 117 then determines which users have a high preference indicator for this media clip. It then accesses the rows of the users having a high preference indicator for the currently played media clip, and determines which other media clips have a high preference indicator for that user. The identification of these other media clips are provided to the user as a recommendation of other media clips that the user may find appealing. If a plurality of users and rows are accessed, the preference indicators of the plurality of users are preferably averaged and the media clips having the highest averaged preference indicator are recommended.

In the specific example of FIG. 2, the user of the user terminal may thus play media clip 3. The recommendation processor 117 will determine that User 1 and User 3 have rated this media clip highly. User 1 has also rated media clip 1 highly and User 3 has also rated media clip 3 and 4 highly. Thus, in one embodiment media clips 1, 2 and 4 are recommended to the user. However, if only two media clips are to be recommended in order to maintain a short list of recommendations, the recommendation processor 117 determines that media clip 1 has an average rating of 8+2/2=5, media clip 2 an average rating of 8 (as User 1 has no preference indicator for media clip 2), and media clip 4 has an average rating of 4+8/2=6. Consequently, only media clips 2 and 4 will be recommended to the user.

In the preferred embodiment, the community preference information of the database 115 is updated as described in the following.

The communication processor 111 continually controls the receiver to scan the frequency band of the wireless communication protocol or system to detect if any other user terminals are within range. In the preferred embodiment, the user terminal 100 the transmitter 119, and the communication processor 111 controls the transmitter to intermittently transmit a pilot signal. This pilot signal is used by other user terminals to detect that the user terminal is within range and that communication can be established. The pilot signal is transmitted intermittently to save power consumption and increase battery life. Likewise, in the user terminal 100 the receiver 109 scans the frequency band for pilot signals under the control of the communication processor 111, and if the communication processor 111 detects the presence of a pilot signal, it controls the transmitter 119 to transmit an access signal to the other user terminal 103. The two user terminals then proceed to establish a wireless connection for data transfer in accordance with a suitable radio communication protocol, and the second user terminal 103 consequently transmits the community preference information of its data base to the first user terminal 100. Thus, the communication processor 111 determines if communication with another user terminal can be established and if so, it receives community preference information from the other user terminal.

It is within the contemplation of the invention, that any suitable form of communication between user terminals can be used. In some embodiments, the user terminals communicate through wireline links, infrared communication and/or radio links. Similarly, different implementations of communication protocols may be used and specifically in one embodiment, the user terminals continuously broadcast the community preference information, which can be picked up by any other user terminal within range. In this embodiment only a very simple protocol is thus required but a high power consumption is required by the continuous transmission of data. In some embodiments the user terminals form part of a cellular communication system such as the $3^{rd}$ Generation cellular communication system UMTS (Universal Mobile Telecommunication System).

The received community preference information is passed to the database controller 113 which updates the database of community preference information in response to the received community preference information. In the preferred embodiment, the received community preference information corresponds to the whole database content of the second user terminal 103 transmitted sequentially, one row (i.e. one user) at the time. If the communication link is maintained for long enough the entire contents of the database of the second user terminal 103 is communicated to the first user terminal 100.

Preferably, the received community preference information comprises time information and the database controller is operable to update the community preference information of the local database in response to this time information. Specifically, in the preferred embodiment, each row corresponding to each user comprises a time stamp indicating when the information was updated by the corresponding user. Thus, the community preference information transmitted by User 3 is always up to data for his own preference indicators and consequently row 3 transmitted by User 3 is time stamped by the time of transmission. Another user terminal receiving row 3 will store this row in its database with that time stamp. When this user terminal subsequently exchanges communication with a third user terminal, it will transmit its database content including row three, which is time stamped with the transmission time of the original transmission from User 3. The third user terminal then compares the time stamp of the received community preference information with the time stamp of the community preference information for User 3 already stored in the database of the third user terminal. If the time stamp reflects that the received community preference information is newer, the database is updated and otherwise row 3 of the database is not modified.

Thus, the database controller 113 of the user terminal 100 checks the time information of the received community preference information and only updates the database content when the received community preference information is newer than the already stored community preference information. In this way, updated community preference information is automatically distributed in the systems in an organic fashion where user terminals coming into contact with each other exchange community preference information and updates the relevant elements of its own database.

In addition, the database controller 113 detects if the received community preference information comprises information related to users or media clips which are not comprised in the local database 115. If so, a new row or column respectively is created in the database 115. For example if the user terminal 100 comprises community preference information for Users 1, 3, 5, 9 and 10, the receipt of a community preference information database as that shown in FIG. 2 will result in new information for User 2, 4 and 6 being added to the current information. Depending on the time stamp of the community preference information, the information for users 1, 3 and 5 is furthermore updated.

Thus, the stored community preference information automatically expands as it comes into contact with other user terminals. Community preference information thus automatically; and organically spreads throughout the community resulting in improved recommendations without requiring a centrally held database or collection of data. Further there is no requirement to be connected to a central processing unit or database to receive a recommendation but rather this can be achieved locally based on only locally held information.

In the preferred embodiment, the user terminal is a portable device which may have different modes of connectivity.

In the first mode, the portable device is fully connected to a fixed network such as the Internet. In this case, a high speed connection to a central database and/or a high number of users of the community may be possible, and the recommendation process may include determining recommendations based on accessing the centrally stored information. Furthermore, the local database for the portable user terminal may be updated with community preference information received through the high speed connection from other users connected to the Internet or from the central database.

In a second mode of connectivity, the portable device has a direct link with one or more portable user terminals. The bandwidth of this connection is likely to be medium and the local database can be updated with community preference information from the other user terminal(s). This connection is likely to be setup when two portable user terminals are sufficiently close to allow for a direct radio connection of sufficient quality. Consequently as the users of the portable user terminals move around, these connections will temporarily and dynamically be setup whenever possible.

In a third mode of connectivity, the portable user terminal is not connected and instead operates entirely as an independent stand alone unit. However, recommendations can still be generated as these are based on locally stored community preference information.

Hence, in the preferred embodiment the database information is updated when the user terminal is connected to the Internet or when a temporary connection to another user terminal is available. As especially the connections to the other portable user terminals may be of relatively short duration, it is often not feasible to exchange the information of the entire database from one user terminal to the other. Rather community preference information is transferred for as long as the connection is established, and the received, community preference information is used to update the relevant parts of the database.

In order to increase the probability that the most relevant or important community preference information is transferred during the temporary connection, the received community preference information is received in a prioritised order. Thus, rather than transmitting the contents of the database starting from the first location, the community preference information of specific relevance is transmitted first. Specifically, the user terminal 100 comprises a priority controller 123 which determines a priority of elements of the community preference information. The priority controller 123 is connected to the recommendation processor 117 and is further connected to the transmitter 119, which communicates this priority to the second user terminal 103. The second user terminal 103 receives this priority information and transmits the community preference information to the first user terminal 100 such that the highest prioritised community preference information is transmitted first.

Specifically, the update of the database uses a synchronisation process wherein the time stamp information is used to determine whether specific entries or fields of the two databases are synchronised. In particular, the following process is used.

Step 1: Determine the next most relevant field which is unsynchronised.

The most relevant filed is determined from consideration of the following criteria in the shown order:
The preference information of the user of the second user terminal is considered the most relevant as it is fully up to date.
The preference information related to the media clips which are most interesting to the user.
This may for example be determined by the number of times the media clip has been played or by the rating given by the user.
The preference information of users which have similar interests as the user. This is preferably determined as users having a high correlation between the user ratings with that of the current user.
The preference information related to newer updates, i.e. preference information having recent time stamps.
The preference information of new users or media clips.

Step 2: Synchronise the field determined in step 1 between the first and second user terminal.

Step 3: Determine if all fields have been synchronised. If not, return to step 1 to determine the next field to be synchronised.

In addition, change numbers applied to the fields and/or fingerprints per user or per media clip can be used to quickly determine that large parts of the database are identical, and consequently do not need to be updated.

Due to the prioritisation of community preference information as described, a very quick distribution of especially new and the most relevant community preference information is quickly disseminated into the network of user terminals belonging to the community.

In the preferred embodiment the user terminals thus form a peer to peer network, and the user terminal is therefore preferably operable to communicate with the second user terminal using a peer to peer protocol. Hence, the community preference information is distributed throughout the peer to peer network, and the system does not require central control or processing. Rather, the control and processing is performed locally in portable user terminals and the peer to peer network provides a low complexity method of providing community information to a large number of users.

Figure 3:
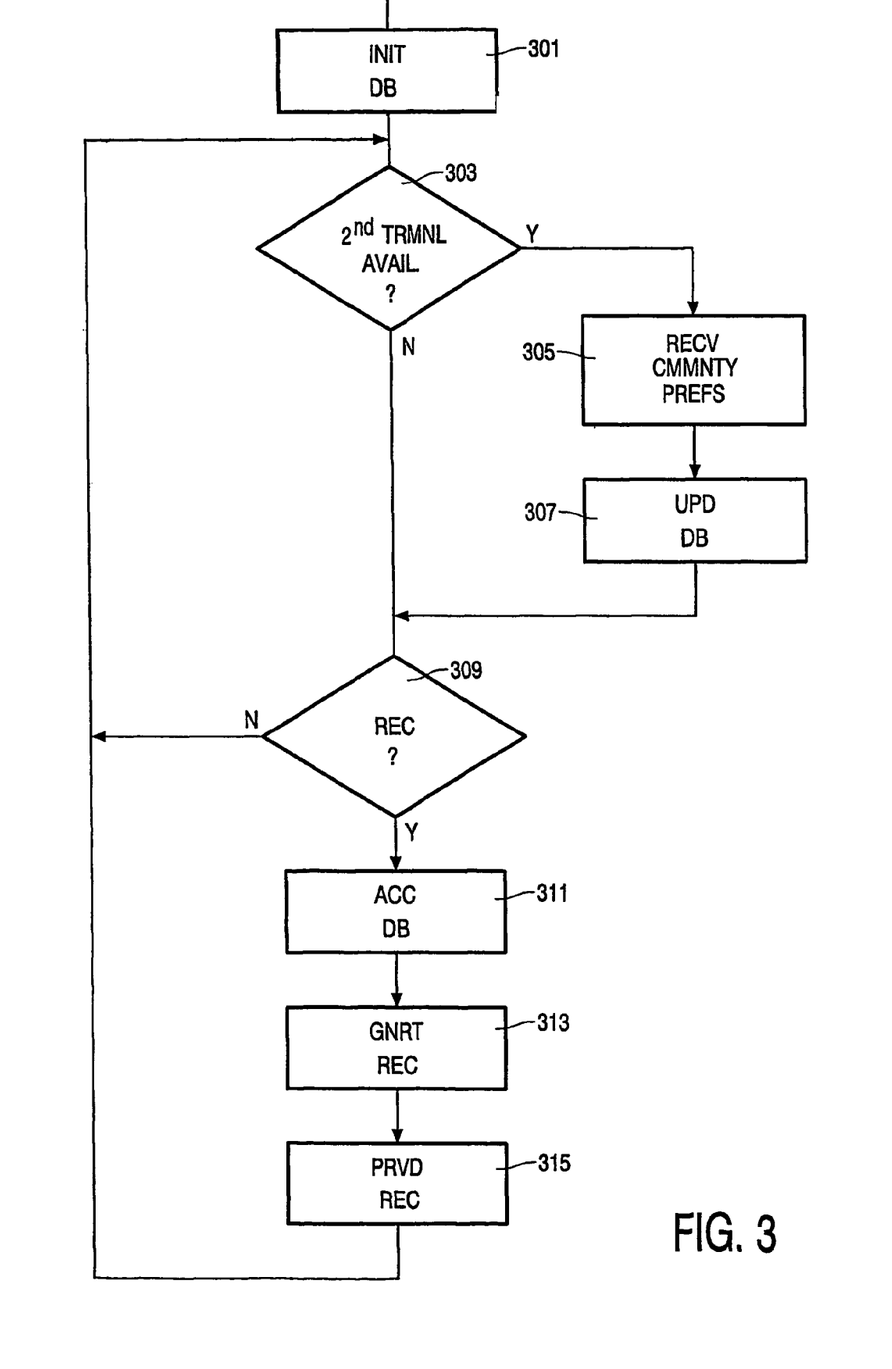
FIG. 3 is an illustration of a method of operation of a user terminal in accordance with an embodiment of the invention.

FIG. 3 is an illustration of a method of operation of a user terminal 100 in accordance with an embodiment of the invention.

In step 301, the database is initialised. In the simplest form the database is simply initialised as an empty database which is subsequently populated by the connections setup to other user terminals. However, in the preferred embodiment, the database is initialised by downloading community preference information from a centralised database through a connection to the Internet.

In step 303, it is determined if a communication with a second user terminal is possible. Specifically, a relevant frequency band may be scanned for beacons or pilot signals from other user terminals. If communication with a second user terminal is possible, the method proceeds in step 305 by receiving community preference information from the second user terminal. Preferably, the received community preference information is received in a prioritised order. If communication with a second user terminal is not possible, step 303 is followed by step 309.

In step 307 which follows step 305, the database of community preference information is updated in response to the received community preference information. The method the proceeds in step 309, wherein it is determined if a recommendation should be generated. In the preferred embodiment, a recommendation is generated whenever the playback of a new media clip is initiated. If no recommendation is required, the method returns to step 303.

If a recommendation is to be generated, the method proceeds in step 311 by accessing the community preference information of the local database. The method then proceeds in step 313 by generating a recommendation in response to the community preference information retrieved from the local database. Subsequently, in step 315, the recommendation is provided to the user for example by displaying a text identification of the recommended media clip(s) on a suitable display of the user terminal. After step 315, the process returns to step 303.

In the preferred embodiment, the local database of the user terminal is operable to comprise community preference information related to the whole community. Thus, the information related to the whole community is built up and stored locally in the user terminal, and consequently the recommendation can be made based on community preference information from the whole community even when the user terminal is not connected to any other user terminal or any network.

In some embodiments, not all user terminals comprise a full database. In these embodiments the user terminals with a large database can act as a master database from which only a subset of specifically relevant community preference information is transmitted to a user terminal having a limited database storage capacity. Hence, some user terminals may act as thin clients with reduced functionality being supported by thick clients having increased functionality. Thus, a mixture of architectures and functionality of the user terminals is possible within the same peer to peer network.

In one embodiment, user terminals further comprises means for communicating the recommendation to another user terminal. Specifically, in one such embodiment, some user terminals may not comprise functionality for generating a recommendation and/or for storing community preference information. In this embodiment, recommendations based on the community preference information can still be provided to the user of that user terminal by a recommendation being generated in the first user terminal and subsequently communicated to the reduced performance user terminal. The recommendation is generated in the first terminal in the same way as for a local recommendation, and thus preferably the reduced performance user terminal initially transmits information related to its user preferences and/or e.g. the media clip being currently played.

In some embodiments, the data network comprises a plurality of wireless user terminals as previously described, wherein some of the wireless user terminals are operable to receive community preference information from a fixed network, such as the internet. These user terminals distribute the community preference information from the fixed network to other wireless user terminals through direct radio links as previously described. Further, these user terminals are able to distribute the community preference information from the fixed network while disconnected from the fixed network. Thus, in some embodiments, a central database of community preference information may be generated. This central database can be accessed by some of the user terminals which download the community preference information and consequently disseminate the information in the community of user terminals by direct communication between the user terminals. This provides for a highly effective way of distributing information to communities of users by infrequent and sporadic access to a central database.

Thus, the preferred embodiment provides for a highly efficient system of updating and synchronising community preference information such that recommendations based on community preference information can be generated from locally stored information. Full synchronisation of the databases is not necessary. Rather a community forms a dynamic, "organic", changing entity. For example, in different parts of the world, different preferences may dominate and these will spread to other parts. However, the spreading of preferences will automatically adapt to local taste and preferences, and thus the recommendations will automatically be targeted to the characteristics of the users, while allowing and encouraging change. Thus, the interaction between the user terminals mirror the interaction between members of a community and thus behaviour of the peer to peer recommendation network will resemble the behaviour in real communities.

The invention can be implemented in any suitable form including hardware, software, firmware or any combination of these. However, preferably, the invention is implemented as computer software running on one or more data processors. The elements and components of an embodiment of the invention may be located in any suitable location and the functionality may be implemented in a single physical unit, in a plurality of physical units or as part of other functional physical units. However, preferably the invention is implemented in single processor of a single physical entity forming a user terminal.

The scope of the present invention is limited only by the accompanying claims.

The invention claimed is:

1. A user terminal for a network, the user terminal comprising:
   a local database comprising community preference information related to preferences of a community of users;
   a processor for determining if a communication with a second user terminal is possible;
   a receiver for receiving community preference information from the second user terminal if communication is possible, wherein the community preference information relates to media clips;
   a database controller for updating the database of community preference information in response to the received community preference information, the database being stored in a matrix structure wherein there is a column for each media clip and a row for each user, each row comprising a time stamp indicating when the information was updated by the corresponding user;
   a recommendation processor for generating a recommendation in response to the community preference information of the local database, wherein the recommendation is of a media clip; and
   wherein the user terminal compares the time stamp of the received community presence information for a specific user with the time stamp of the community presence information already stored in the database in a row corresponding to said specific user and if the time stamp reflects that the received community presence information is newer, the database is updated with the received community presence information and otherwise said row is not modified.

2. A user terminal as claimed in claim 1 wherein the user terminal is a wireless user terminal.

3. A user terminal as claimed in claim 1 wherein the communication with the second user terminal is over a direct wireless link between the user terminal and the second user terminal.

4. A user terminal as claimed in claim 1 wherein the local database is operable to comprise community preference information related to the whole community.

5. A user terminal as claimed in claim 1 wherein the user terminal is operable to communicate community preference information from the local database to the second user terminal if communications with the second user terminal is possible.

6. A user terminal as claimed in claim 1 wherein the user terminal is operable to communicate with the second user terminal using a peer to peer protocol.

7. A user terminal as claimed in claim 1 wherein the community preference information comprises a user rating.

8. A user terminal as claimed in claim 1 wherein the user terminal further comprises means for communicating the recommendation to another user terminal.

9. A user terminal as claimed in claim 1 wherein the user terminal further comprises an interface for receiving community preference information from the Internet.

10. A user terminal as claimed in claim 1 wherein the received community preference information is received in a prioritized order.

11. A data network comprising at least one user terminal as claimed in claim 1.

12. A data network as claimed in claim 10 wherein the data network is a peer to peer data network.

13. A data network as claimed in claim 10 wherein the data network comprises a plurality of wireless user terminals according to claim 1, and wherein at least one of the plurality of wireless user terminals are operable to receive community preference information from a fixed network and distribute the community preference information from the fixed network to other wireless user terminals.

14. A data network as claimed in claim 12 wherein the fixed network is the Internet.

15. A data network as claimed in claim 12 wherein the at least one wireless user terminal is operable to distribute the community preference information from the fixed network while disconnected from the fixed network.

16. A method of providing a recommendation to a user of a user terminal, the method comprising the steps of:
   locally in the user terminal storing a local database comprising community preference information related to preferences of a community of users;
   determining a priority of elements of the community preference information in the local database;
   determining if a communication with a second user terminal is possible;
   and if so:
   receiving community preference information from the second user terminal, wherein the community preference information relates to media clips;
   updating the database of community preference information in response to the received community preference information, the database being stored in a matrix structure wherein there is a column for each media clip and a row for each user, each row comprising a time stamp indicating when the information was updated by the corresponding user;
   comparing the time stamp of the received community presence information for a specific user with the time stamp of the community presence information already stored in the database in a row corresponding to said specific user and if the time stamp reflects that the received community presence information is newer--updating the database with the received community presence information and not modifying said row otherwise;

generating a recommendation in response to the community preference information of the local database, wherein the recommendation is of a media clip; and providing the recommendation to the user.

17. A non-transitory computer readable medium including code for a user terminal for a network, medium comprising:

code for storing community preference information related to preferences of a community of users, wherein the community preference information relates to media clips;

code for determining a priority of elements of community preference information in the local database;

code for determining if a communication with a second user terminal is possible;

code for receiving community preference information from the second user terminal;

code for updating the database of community preference information in response to the received community preference information, the database being stored in a matrix structure wherein there is a column for each media clip and a row for each user, each row comprising a time stamp indicating when the information was updated by the corresponding user;

comparing the time stamp of the received community presence information for a specific user with the time stamp of the community presence information already stored in the database in a row corresponding to said specific user and if the time stamp reflects that the received community presence information is newer, updating the database with the received community presence information and not modifying said row otherwise;

code for generating a recommendation in response to the community preference information of the local database, wherein the recommendation is of a media clip; and code for transmitting the recommendation to the user.

* * * * *